United States Patent
Qin et al.

(10) Patent No.: US 9,478,341 B2
(45) Date of Patent: Oct. 25, 2016

(54) SOLENOID ASSEMBLY FOR FRICTION CLUTCH

(71) Applicant: BorgWarner Inc., Auburn Hills, MI (US)

(72) Inventors: Shiwei Qin, Battle Creek, MI (US); James Ignatovich, Ceresco, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/441,359

(22) PCT Filed: Nov. 4, 2013

(86) PCT No.: PCT/US2013/068243
§ 371 (c)(1),
(2) Date: May 7, 2015

(87) PCT Pub. No.: WO2014/074438
PCT Pub. Date: May 15, 2014

(65) Prior Publication Data
US 2015/0270047 A1     Sep. 24, 2015

Related U.S. Application Data

(60) Provisional application No. 61/725,470, filed on Nov. 12, 2012.

(51) Int. Cl.
*H01F 7/14* (2006.01)
*H01F 7/128* (2006.01)
*F16D 27/11* (2006.01)
*H01F 7/16* (2006.01)
*F16D 27/14* (2006.01)
*H01F 7/06* (2006.01)
*H01F 7/08* (2006.01)
*H01F 7/126* (2006.01)
*F16D 13/76* (2006.01)
*F02B 67/06* (2006.01)

(52) U.S. Cl.
CPC .............. *H01F 7/128* (2013.01); *F16D 27/11* (2013.01); *F16D 27/14* (2013.01); *H01F 7/06* (2013.01); *H01F 7/081* (2013.01); *H01F 7/126* (2013.01); *H01F 7/1638* (2013.01); *F02B 67/06* (2013.01); *F16D 13/76* (2013.01)

(58) Field of Classification Search
CPC   F16D 27/00–27/14; H01F 7/06; H01F 7/08; H01F 2007/083; H01F 7/14; H01F 7/1638
USPC ............................. 335/296, 297; 192/84.96
See application file for complete search history.

(56) References Cited

U.S. PATENT DOCUMENTS 3,565,223 A  *  2/1971  Pierce ................. F04B 27/0895
                                                         192/107 C
4,100,519 A      7/1978  Neff
(Continued)

FOREIGN PATENT DOCUMENTS

GB          1296833         * 11/1972

*Primary Examiner* — Ramon M Barrera
(74) *Attorney, Agent, or Firm* — Harness, Dickey & Pierce, P.L.C.; John A. Artz (57) ABSTRACT

A solenoid assembly having a solenoid core, coil and flux plate. The flux plate has inner and outer ring members connected by connecting members. A stop member with a ledge is used to selectively prevent an armature member from coming into contact with the flux plate.

10 Claims, 5 Drawing Sheets

(56) References Cited

U.S. PATENT DOCUMENTS

| | | |
|---|---|---|
| 4,190,141 A | 2/1980 | Bennett et al. |
| 5,690,195 A | 11/1997 | Kruckemeyer et al. |
| 5,911,291 A | 6/1999 | Suetake et al. |
| 8,839,931 B2 * | 9/2014 | Gebhart ............... F16D 27/112 192/66.21 |
| 2005/0205336 A1 | 9/2005 | Yamasaki et al. |
| 2010/0236888 A1 | 9/2010 | Pritchard et al. |

* cited by examiner

SOLENOID ASSEMBLY FOR FRICTION CLUTCH

CROSS-REFERENCE TO RELATED APPLICATIONS

This application claims priority to U.S. Patent Application Ser. No. 61/725,470 filed on Nov. 12, 2012, which is related to U.S. Patent Application Ser. No. 61/474,928, which is entitled "Friction Clutch Assemblies" and was filed on Apr. 13, 2011, now PCT/US2012/032863 filed on Apr. 10, 2012.

TECHNICAL FIELD

Solenoid assemblies for friction clutch mechanisms, particularly for dual mode coolant/water pumps, are disclosed.

BACKGROUND

Water pumps are used in water cooled engines, primarily for operation of vehicles such as automobiles and trucks with internal combustion engines. The water pumps are typically driven by a belt attached to the crankshaft of the engine and thus operate at some percentage of engine speed. The pumps have an impeller that is used to circulate the engine coolant from the engine to the radiator and back in order to keep the coolant within acceptable temperature limits.

Efforts are being made today to reduce the power consumption of engine accessories, such as water pumps, in order to improve fuel economy and reduce emissions. A unique dual mode water pump that operates with less power, reduces engine load, improves fuel economy and reduces undesirable emissions is disclosed in U.S. Patent Application Ser. No. 61/474,928.

The water pump disclosed in Ser. No. 61/474,928 has two modes of operation, a first mode mechanical driven by the engine belt, and a second mode operated by an electric motor, such as a brushless DC (BLDC) motor. The components for the two modes of operation are contained within a housing that includes the pulley member as part of the housing. A shaft connected to the impeller of the water pump is positioned in the housing and is controlled by one mode of operation or the other, depending on certain factors.

The housing is turned at input speed by the belt of the engine positioned on the pulley member. A friction clutch assembly is positioned inside the housing to selectively allow operation of the water pump mechanically by the pulley member. A solenoid is utilized to control operation of the friction clutch assembly.

The water pump is normally driven by the electric motor throughout most of its range of operation. Where peak cooling requirements are needed, the mechanical mode of operation takes over and the water pump is driven directly by the pulley member. The friction clutch assembly can include a softening spring member which minimizes the electrical power consumed by the clutch. The dual mode cooling pump can also utilize a variable speed control which results in the use of less power.

SUMMARY OF THE INVENTION

An improved solenoid assembly is disclosed for a friction clutch mechanism which can be used to improve the operation of the friction clutch mechanism and in turn improve the operation of a dual mode water pump.

The solenoid assembly includes a coil positioned in a solenoid core. A flux plate secures the coil in the core. The flux plate has an inner ring and an outer ring connected at a few locations by small bridge or connector members. An armature plate is positioned adjacent the solenoid assembly. A stop member is used to prevent the armature plate from contacting the flux plate.

In use, the armature plate controls the movement of a friction member which is used to selectively activate the mechanical mode of the water pump. When the solenoid assembly is activated, it provides a force to overcome a spring biasing force and disengage the clutch.

The unique solenoid assembly reduces magnetic reluctance and current while maintaining the same solenoid force. A lower current corresponds to lower power consumption and increases the reliability of the control circuit.

Further objects, features and benefits of the invention are set forth below in the following description of the invention when viewed in combination with the drawings and claims.

DESCRIPTION OF THE PREFERRED EMBODIMENTS

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated solenoid assembly and described methods and further applications of the principles of the invention which would normally occur to persons or ordinary skill in the art to which the invention relates.

The present inventions described herein particularly relate to solenoid assemblies for use with friction clutch mechanisms in dual mode water pumps used to circulate the coolant in an engine, such as an automobile internal combustion engine. However, the present solenoid assembly invention can also be used for other mechanisms and other products. For purposes of describing the structure, use and operation of the unique solenoid assembly, however, it will be described herein with respect to a dual mode water pump of the type disclosed in U.S. application Ser. No. 61/474,928.

As a coolant pump, the dual mode water pump is electrically driven under most conditions. However, it also can be mechanically engaged where more cooling is required. When the vehicle is being driven under most normal conditions, the water pump is being driven and operated by the electric motor. During "worst case" cooling conditions, such as when the vehicle is heavily loaded, when it is pulling a trailer, when it is going uphill in the summertime, etc., the water pump is adapted to be mechanically driven by the belt directly from the engine. This provides the necessary cooling under such circumstances.

In accordance with a preferred embodiment of the dual mode water pump, the electric motor is a brushless DC (BLDC) motor and the motor is positioned inside a pulley assembly. The pump is also adapted to be driven mechanically when needed by the engine belt, such as a serpentine belt, attached to the crankshaft of the engine.

For purposes of disclosing the operation and use of the present solenoid assembly invention, and its improvement over the solenoid assembly and friction clutch mechanism shown and disclosed U.S. Application Ser. No. 61/474,928, the unique dual mode water pump assembly in that application will first be described.

Figures 1, 2:
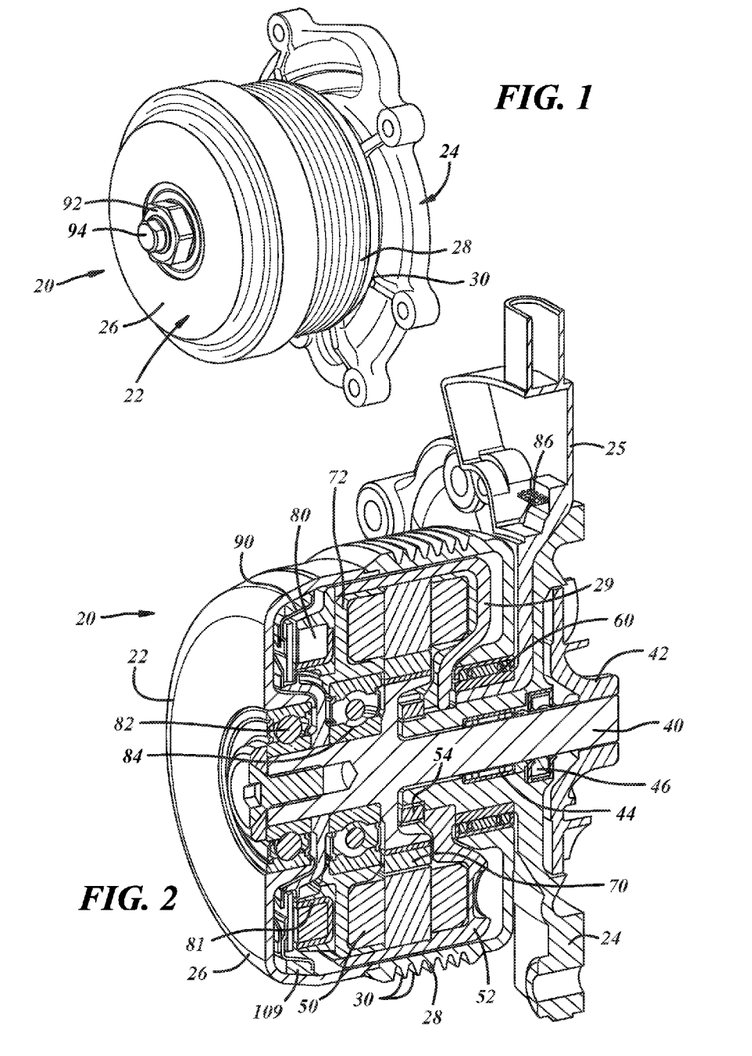
FIG. 1 illustrates a water pump in accordance with one embodiment of the invention.
FIG. 2 is a cross-sectional view of the water pump shown in FIG. 1.

The dual mode water pump is shown in FIG. 1 and referred to generally by the reference numeral 20. The dual mode water pump includes a pulley assembly 22 and a water pump housing 24. The pulley assembly 22 has a clutch housing member 26 and a pulley member 28. The pulley member 28 has circumferential grooves 30 for being driven by a belt (not shown).

Figure 3:
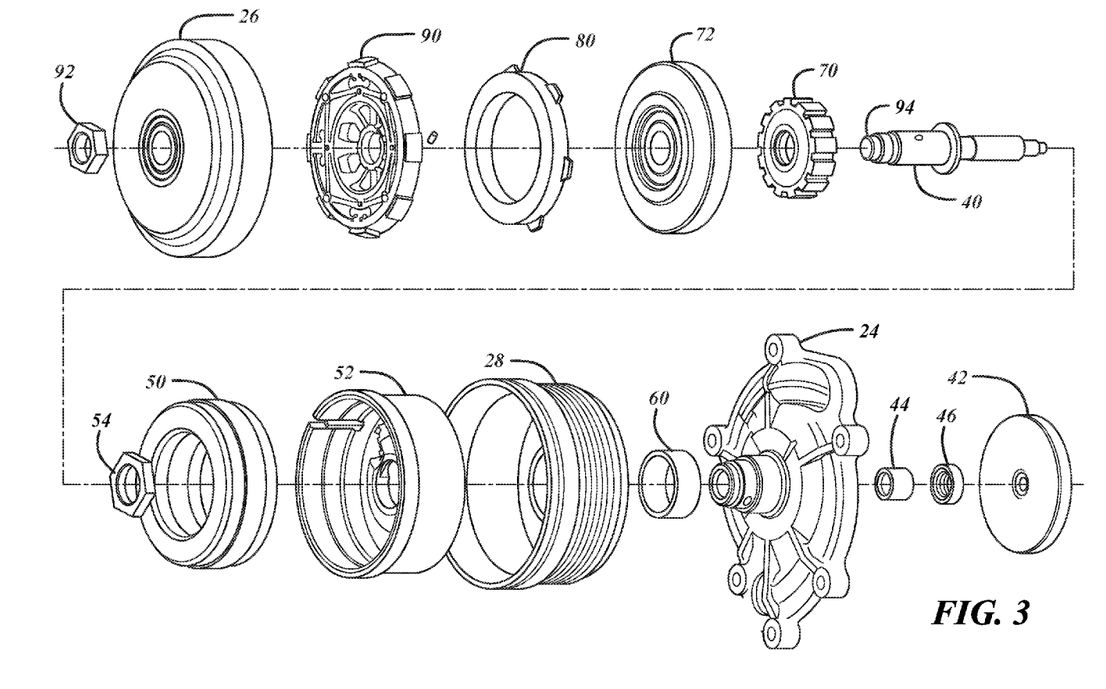
FIG. 3 is an exploded view of the components of the water pump as shown in FIGS. 1 and 2.

A cross-sectional view of the water pump 20 is shown in FIG. 2 and an exploded view of the components of the water pump 20 is shown in FIG. 3.

The water pump has an impeller shaft 40 which is positioned within the pulley assembly 22 and also is attached to a water pump impeller 42. The impeller shaft 40 is held in place in the pump housing 24 by needle bearing 44 and middle bearing 84. A coolant seal 46 is used to prevent coolant in the pump from leaking into the pulley assembly.

A motor stator 50 is positioned inside a stator housing 52 in the pulley assembly 22. A nut, such as a spanner nut 54, is used to hold the stator housing 52 to the pump housing 24.

A second needle bearing 60 is positioned between the pulley member 28 and the pump housing 24 in order to allow the pulley assembly 22 to rotate freely relative to the pump housing.

A motor rotor 70 is positioned inside a front bearing carrier 72, which preferably is made from an aluminum material. The motor is preferably a brushless DC (BLDC) electric motor. A solenoid member 80 is positioned immediately adjacent the front bearing carrier 72. A friction clutch assembly 90 is positioned adjacent the front cover of the pulley assembly 26 and operated by the solenoid member 80. Bearing member 84 is positioned between the bearing carrier 72 and the impeller shaft 40.

A fastening member such as a hex nut 92 secures the pulley assembly 22 to the impeller shaft 40 via a threaded section 94 on the impeller shaft 40. A front bearing 82 supports the pulley assembly 22 for rotation on the impeller shaft 40. As indicated particularly in FIGS. 2 and 3, the pulley assembly 22 consists of two pieces, namely a pulley member 28 and clutch housing 26. This configuration provides for distribution of the belt load between the second needle bearing 60 and the front ball bearing 82, thereby eliminating overhung bearing loads. Consequently, the bearing loads are minimized resulting in a more durable and long-lasting product.

As indicated, the water pump is normally driven by the electric motor. The electric motor is electrically powered through a circuit board (not shown) connected to pin-type contact members 86. Electrical leads and wires can be insert molded in housing 25 and lead frame 29 in order to carry the electrical signals to the electric motor stator 50 and solenoid 80. The circuit board further communicates with the electronic control unit (ECU) of the vehicle through the vehicle communication network such as a CAN network. The pump controller circuit board could also be positioned inside the pulley assembly 22 rearward of the stator housing 52 and having a donut shape.

The speed of the motor and thus the water pump is selected according to the cooling required for the engine. Sensors feed relevant data to the ECU which then sends a signal to the pump controller requesting the desired speed. The pump controller then determines whether the desired speed is best achieved using the electric motor or by engaging the friction clutch and driving the impeller directly from the pulley.

Figure 4:
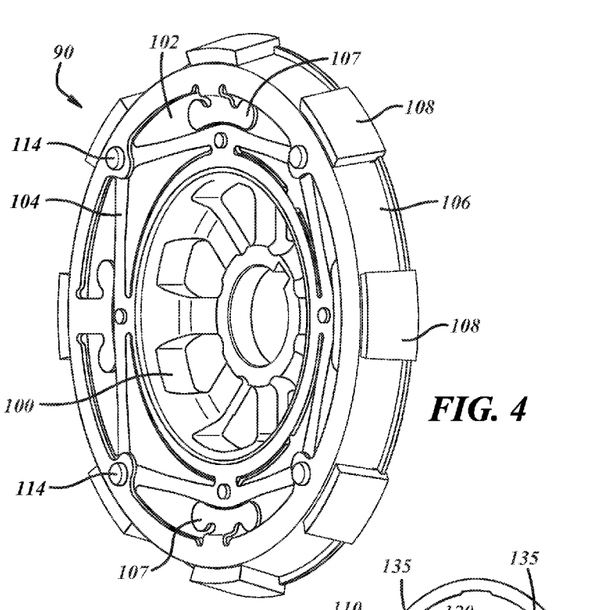
FIG. 4 illustrates a friction clutch embodiment which can be used with a dual mode water pump.
Figure 5:
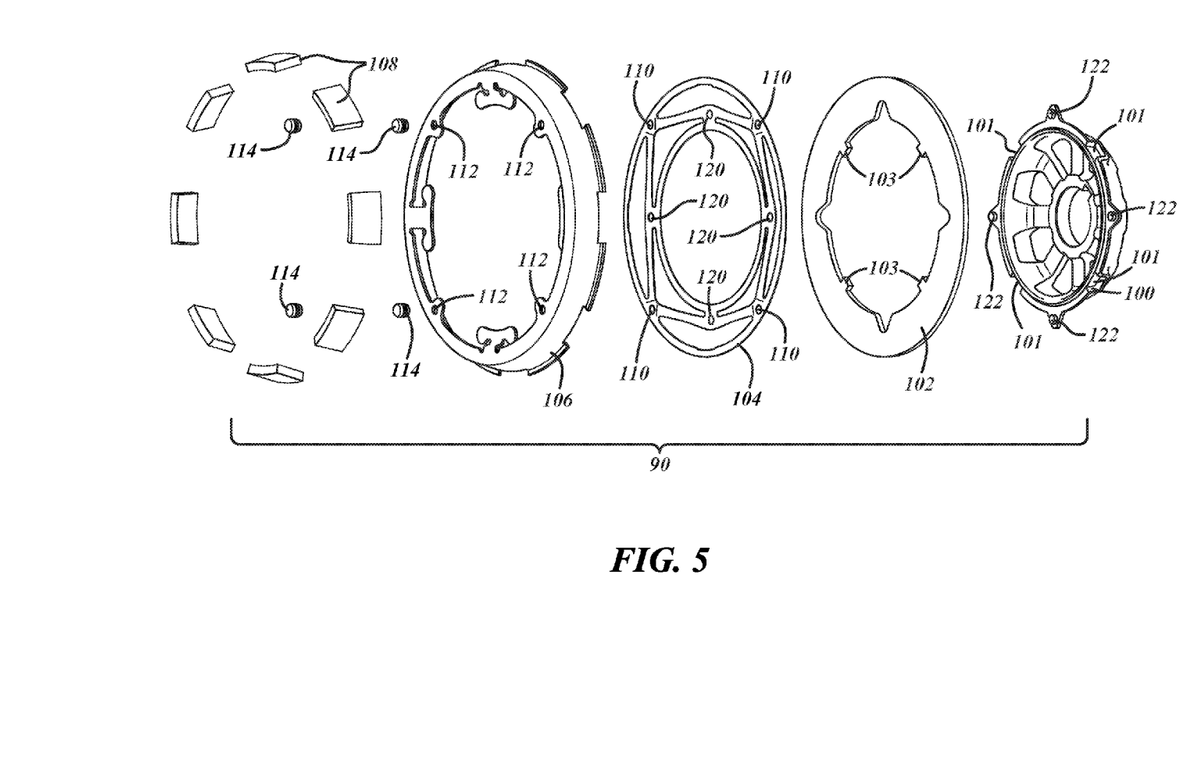
FIG. 5 is an exploded view of the friction clutch as shown in FIG. 4.

An enlarged view of the friction clutch assembly 90 is shown in FIG. 4, while an exploded view of the components of the friction clutch 90 is shown in FIG. 5. The friction clutch 90 includes a clutch carrier member 100, a flux plate member 102, a compression spring member 104, and a friction lining carrier member 106. Pieces of friction lining material 108 are attached to its outer circumference of the carrier 106, as shown in FIG. 4. The friction lining members 108 can be of any conventional friction material and can be of any size and shape. Although the friction lining material is shown with a plurality of separate members, as shown in FIGS. 4 and 5, the friction lining can be a single piece or any number of separate members positioned around the circumference of the friction lining carrier member 106.

Figure 6:
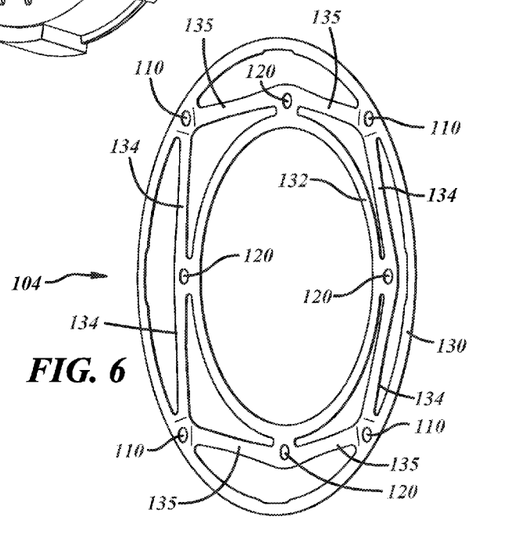
FIG. 6 is an embodiment of a compression spring which can be used with a dual mode water pump.

An enlarged view of one embodiment of a compression spring member 104 is shown in FIG. 6. The spring member 104 is a "softening" spring member since the force necessary to compress it decreases over time once it reaches a certain peak.

The spring member 104 has a plurality of holes or openings in order to be attached to the friction lining carrier member and the clutch carrier member. In this regard, a series of four holes 110 are provided on the compression spring member 104 in order to mate with openings 112 in the friction lining carrier member 106. A plurality of rivets 114 or the like are used to secure the compression spring member 104 to the friction lining carrier member 106. The compression spring member can be joined to the friction lining carrier member by any conventional method, such as by welding, brazing, threaded fasteners, etc.

The second series of openings in the compression spring member include four openings 120. These openings mate with corresponding post members 122 on the clutch carrier member 100. The post members 122 are deformed or swaged over when the friction clutch assembly 90 is assembled in order to securely hold the components of the friction clutch assembly together. The compression spring member embodiment 104 has an outer ring member 130 and an inner ring member 132. The two ring members 130 and 132 are connected together by a plurality of connecting members 134 and 135.

When the friction clutch assembly 90 is in the engaged position, torque is transferred from the pulley assembly 22 through the friction lining members 108 to the friction lining carrier 106. The friction lining carrier then transfers torque through the compression spring member 104 to the clutch carrier 100 which turns the impeller shaft.

When the friction clutch assembly 90 is energized by the solenoid 80, the flux plate 102 is attracted to the solenoid assembly due to the force developed in the air gap between the solenoid core 81 and the flux plate. As the flux plate 102 moves toward the solenoid, the compression spring member 104 is compressed separating the friction lining carrier member 106 and friction members from their engaged positions against the inside surface of the clutch housing member 26. In the compressed condition, the connecting members 134 and 135 are buckled and distorted. In this position, the water pump is operated only by the electric motor.

The flux plate 102 is securely attached to the friction lining carrier 106 through tabs 107 (FIG. 4). Axial travel of the clutch assembly is limited by the engagement of tabs 103 on the flux plate 102 within pockets 101 on the clutch carrier member 100 (FIG. 5). This axial travel limit prevents the pole plate from coming into contact with the solenoid core member 81 as the pole plate rotates with impeller speed and the solenoid core is stationary.

It is quite common in automotive accessories such as air conditioning compressors, pumps, etc. to use spring engaged, electromagnetically disengaged clutches to selectively turn on and off the drive to the accessory component. This is typically done to conserve energy when the device is not needed. These devices are typically designed to be spring engaged so the accessory device is powered in the event of a control failure, such as a loss of electrical power. This is done to provide "Fail-Safe" functionality meaning that the device defaults to its "on" state when it is unpowered.

The dual mode water pump 20 described herein provides a "fail safe" friction clutch design. If the electrical system of the vehicle were to fail, the solenoid would be de-energized allowing the spring 104 to engage the friction clutch assembly to the clutch housing. Therefore the pump would operate in mechanical mode with the impeller driven by the pulley through the clutch assembly.

The primary disadvantage of these "Fail-Safe" clutch designs is that they require continuous electrical power to keep the device disengaged when it is not needed. For many accessory devices this condition can constitute a large percentage of their operating life. Furthermore, these devices often require 20+ watts of electrical power, which can be a significant portion of the alternator output. On modern vehicles which employ a large number of electrical components (seat heaters, window defrosters, electric seats, and a host of other devices), it is not uncommon to exceed the maximum power capacity of the alternator.

The solenoid 80 provides the force needed to overcome the engagement force of the spring member and thus disengage the clutch. The solenoid needs to be kept in its "on" condition in order to keep the friction clutch from becoming engaged. The power consumed by the solenoid is parasitic.

The present solenoid assembly invention minimizes the consumption of power. It reduces magnetic reluctance and significantly reduces the current while keeping the same solenoid force. A lower current corresponds to much lower power consumption and increases the reliability of the control circuit.

Figure 7:
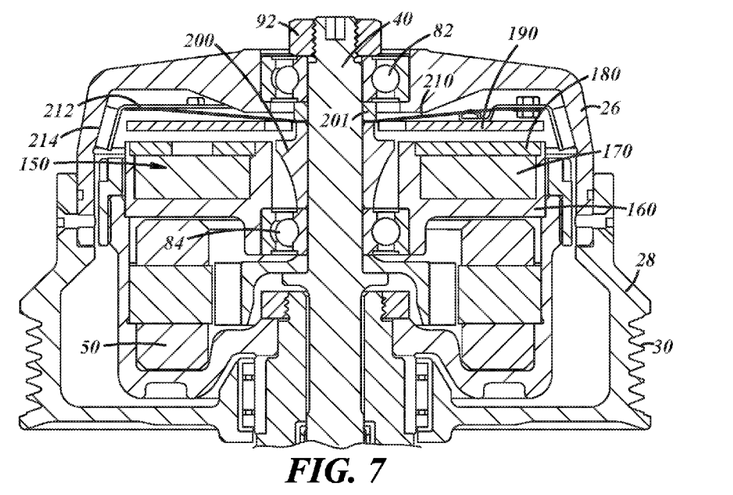
FIG. 7 is a cross-sectional view of a portion of a dual mode water pump utilizing an embodiment of the inventive solenoid assembly.
Figure 8:
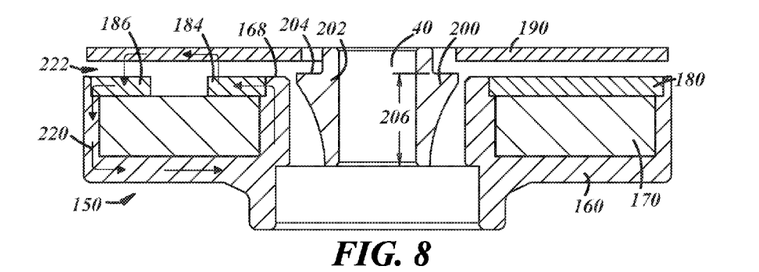
FIG. 8 is an enlarged schematic partial cross-sectional view of a portion of FIG. 7.
Figure 9:
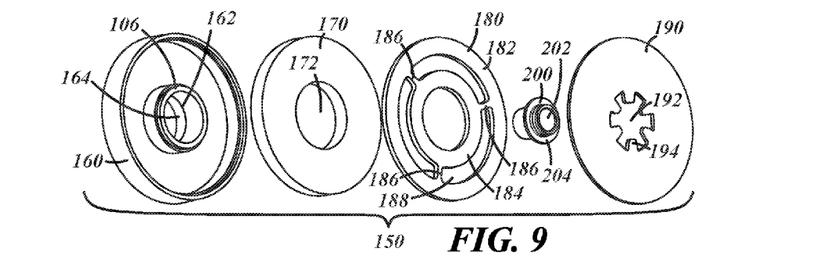
FIG. 9 is an exploded view of some of the components of the unique solenoid assembly shown in FIGS. 7 and 8.

A preferred embodiment of the unique solenoid assembly is shown in FIGS. 7-9. It is designated by the reference number 150. In the cross-sectional views of FIGS. 7 and 8, components of the dual mode water pump which are the same as those of the water pump described above, are referenced by the same reference numbers.

The solenoid assembly includes a solenoid core 160, a coil member 170, a flux plate member 180, an armature plate 190 and a stop member 200.

The solenoid core has basically a dish or cup-shape with a cavity 162 and preferably is made of a magnetic metal material, such as low carbon steel. The coil member is made of coiled copper wine and has a typical "donut shape". In the assembly, the coil member 170 is press fit or potted in the cavity 162 in the solenoid core 160 in order to minimize air gaps.

The flux plate member 180 has an outer ring member 182 and an inner ring member 184. The two ring members are connected by several connection members 186 (a/k/a "bridge members"). Although three connection members 186 are shown in FIG. 9, the number is not critical. There can be more or less connection members. The connection members, however, preferably are relatively narrow and spaced apart so that the outer and inner ring members are adequately separated by an insulating annular air gap 188.

The flux plate member 180 is made of a magnetic metal material, such as low carbon steel. The flux plate member 180 is pressed into the cavity 162 in the solenoid core 160 on top of the coil member 170 and preferably is positioned directly against the coil member.

The solenoid core 160 has a central opening 164 with an annular flange 166 which allows the solenoid core to be positioned around the central shaft member 40 in the dual mode water pump. The coil member 170 has a corresponding opening 172 which fits tightly around the flange 166.

The armature plate 190 is also made of a magnetic metal material, such as low carbon steel. It also has a central opening 192 in order to be positioned around the shaft member 40 and stop member 200.

The stop member 200 is made of a non-magnetic material, such as aluminum or stainless steel. It has a central opening 202 in order to be positioned around the shaft member 40, and also has a ledge or shoulder member 204. The length of the body of the stop member is sized to rest against the bearing members 84 or another member which cannot move axially in the dual mode water pump. This prevents the stop member from sliding or moving axially.

As indicated in the drawings, the height 206 of the ledge or shoulder member 204 is above or greater than the height or top edge 168 of the solenoid core 160. This prevents the armature 190 from coming directly in contact with the flux plate 180 when the solenoid is activated. For this purpose, the armature plate 190 has a properly sized central opening 192, or a series of finger members 194 which allow the armature plate to contact the ledge or shoulder member 204.

A deformable spring member 210 is positioned in contact with armature plate 190 (see FIG. 7). The outer ring of the spring member 210 is attached to an annular friction carrier member 212 which has friction members 214 positioned on it. The radially inner edge of the spring member 210 is fixed between stop member 200 and spacer member 201 which abuts against bearing 82.

During normal operation of the dual mode water pump, the solenoid assembly is activated. The flux plate 180 which is energized by the solenoid coil 170, pulls the armature plate 190 against the ledge or shoulder on the stop member 200. This prevents the friction members 214 from contacting the inside surface of the pump housing and thus allowing the water pump to be rotated solely by the electric motor. When it is necessary to mechanically operate the water pump (as explained above), or operate it under both of the dual modes, power to the solenoid is turned off. This allows the spring member 210 to return toward its rest condition and forces the friction members 214 into contact with the pump housing.

The flux circuit 220 is shown in FIG. 8. The flux lines proceed from the solenoid core 160 into the inner ring member 184 where they jump through the air gap 222, pass through the armature plate 190, jump back to the outer ring member 182 of the flux plate, and finally proceed back to the solenoid core.

The flux plate 180 reduces the reluctance of the solenoid. This allows the solenoid to have more force. The flux plate also reduces the current necessary to maintain the same force.

Although the invention has been described with respect to preferred embodiments, it is to be also understood that it is not to be so limited since changes and modifications can be made therein which are within the full scope of this invention as detailed by the following claims.

What is claimed is:

1. A solenoid assembly comprising:
   a solenoid core member having an outer annular wall, an inner annular wall, and an annular end wall extending radially between the outer and inner annular walls, the annular end wall being fixedly coupled to the outer and inner annular wall;
   an annular flux plate having an outer annular ring member, which is fixedly coupled to the outer annular wall, an inner annular ring member, which is fixedly coupled to the inner annular wall, and a plurality of connecting members, each of the connecting members fixedly coupling the outer and inner ring members together, the connecting members being spaced circumferentially about a central axis of the solenoid assembly, the annular flux plate cooperating with the solenoid core to define a cavity; and
   an electromagnet coil received in the cavity between the solenoid core member and the flux plate.

2. The solenoid assembly of claim 1 further comprising a potting compound in which the electromagnet coil is encapsulated.

3. The solenoid assembly of claim 1 wherein said flux plate is press fit to said solenoid core member.

4. The solenoid assembly of claim 1 wherein three of said connecting members are provided.

5. The solenoid assembly of claim 1 further comprising a stop member positioned adjacent said solenoid core member, said stop member made from a material that is not magnetically susceptible.

6. The solenoid assembly of claim 5 wherein said stop member is formed of stainless steel or aluminum.

7. The solenoid assembly of claim 5 wherein said stop member defines a ledge surface that is offset axially from the annular end wall such that ends of the outer and inner annular ring members that are opposite the annular end wall are disposed axially between the electromagnet coil and the ledge surface.

8. The solenoid assembly of claim 7 further comprising an armature that is movable along the central axis between a first position, in which the armature is spaced apart from the ledge surface, and a second position in which the armature is abutted to the ledge surface.

9. The solenoid assembly of claim 7, wherein the ledge surface is disposed radially inward of the annular inner wall.

10. The solenoid assembly of claim 1 further comprising an armature.

* * * * *